(12) United States Patent
Witman et al.

(10) Patent No.: US 10,157,593 B2
(45) Date of Patent: Dec. 18, 2018

(54) CROSS-PLATFORM RENDERING ENGINE

(71) Applicant: MICROSOFT TECHNOLOGY LICENSING, LLC, Redmond, WA (US)

(72) Inventors: Ben Witman, Seattle, WA (US); Dave McDonald, Seattle, WA (US); Michael Y. Joe, Redmond, WA (US); Faaez Ul Haq, New York, NY (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/187,897

(22) Filed: Feb. 24, 2014

(65) Prior Publication Data

US 2015/0243257 A1 Aug. 27, 2015

(51) Int. Cl.
*G06F 21/53* (2013.01)
*G09G 5/36* (2006.01)
(Continued)

(52) U.S. Cl.
CPC .............. *G09G 5/363* (2013.01); *G06F 3/14* (2013.01); *G06F 9/451* (2018.02); *G06T 1/20* (2013.01);
(Continued)

(58) Field of Classification Search
CPC ............................... G06F 21/53; G06F 9/4443
(Continued)

(56) References Cited

U.S. PATENT DOCUMENTS 5,751,283 A 5/1998 Smith
5,864,336 A 1/1999 Yano et al.
(Continued)

FOREIGN PATENT DOCUMENTS

CN 1427373 A 7/2003
CN 101714088 A 5/2010
(Continued)

OTHER PUBLICATIONS

"International Search Report and Written Opinion Issued in PCT Patent Application No. PCT/US2015/016722", dated Jun. 2, 2015, 15 Pages.
(Continued)

*Primary Examiner* — Shivang Patel
(74) *Attorney, Agent, or Firm* — Merchant & Gould P.C.

(57) ABSTRACT

A cross-platform rendering engine. The cross-platform rendering engine serves as an intermediary between the application and the operating system for displaying application content on the screen allowing software developers to write platform-agnostic application code. The application sends content to the cross-platform rendering engine in the form of resource-efficient content descriptions describing the content to be displayed. In turn, cross-platform rendering engine stores the content descriptions and provides rasterized images generated from the content descriptions to the compositor as needed. In the event that a content description corresponding to the texture needed by the compositor is not available, the cross-platform rendering engine pulls the content description from the application. By producing rasterized images from a user interface thread on behalf of the application rather than waiting for the application thread, the cross-platform rendering engine improves the overall responsiveness of the application and contributes to a better user experience.

21 Claims, 13 Drawing Sheets

(51) Int. Cl.
*G06T 1/20* (2006.01)
*G06T 11/00* (2006.01)
*G06F 3/14* (2006.01)
*G06F 9/451* (2018.01)
*G06F 12/0862* (2016.01)

(52) U.S. Cl.
CPC ........ *G06T 11/001* (2013.01); *G06F 12/0862* (2013.01)

(58) Field of Classification Search
USPC .......................................................... 345/522
See application file for complete search history.

(56) References Cited

U.S. PATENT DOCUMENTS

| | | | |
|---|---|---|---|
| 5,977,966 | A | 11/1999 | Bogdan et al. |
| 7,168,048 | B1 | 1/2007 | Goossen et al. |
| 7,302,648 | B1 | 11/2007 | Brunner et al. |
| 7,477,254 | B2 | 1/2009 | Nelson et al. |
| 7,703,036 | B2 | 4/2010 | Satterfield et al. |
| 8,446,415 | B2 | 5/2013 | Brunner et al. |
| 8,786,620 | B2 | 7/2014 | Adams et al. |
| 9,196,075 | B2 | 11/2015 | Borysenko et al. |
| 2003/0134632 | A1 | 7/2003 | Loughran |
| 2004/0189669 | A1 | 9/2004 | David et al. |
| 2005/0088443 | A1 | 4/2005 | Blanco et al. |
| 2006/0184894 | A1 | 8/2006 | Daniels et al. |
| 2006/0274070 | A1 | 12/2006 | Herman et al. |
| 2006/0274080 | A1 | 12/2006 | Lee et al. |
| 2006/0277469 | A1 | 12/2006 | Chaudhri et al. |
| 2007/0233377 | A1 | 10/2007 | Salay et al. |
| 2007/0252834 | A1 | 11/2007 | Fay |
| 2008/0001968 | A1 | 1/2008 | Krueger |
| 2008/0034292 | A1 | 2/2008 | Brunner et al. |
| 2008/0100636 | A1 | 5/2008 | Lai et al. |
| 2008/0270625 | A1 | 10/2008 | Chaturvedi et al. |
| 2008/0303826 | A1 | 12/2008 | Schiff |
| 2010/0013842 | A1* | 1/2010 | Green ........................ G06T 1/00 345/522 |
| 2010/0118038 | A1* | 5/2010 | Labour .................... G06F 21/53 345/522 |
| 2010/0156911 | A1 | 6/2010 | Zhao et al. |
| 2010/0164968 | A1 | 7/2010 | Kwa et al. |
| 2010/0171759 | A1 | 7/2010 | Nickolov et al. |
| 2010/0214313 | A1 | 8/2010 | Herman et al. |
| 2010/0235769 | A1 | 9/2010 | Young et al. |
| 2011/0001753 | A1 | 1/2011 | Frej et al. |
| 2011/0179368 | A1 | 7/2011 | King et al. |
| 2011/0214079 | A1 | 9/2011 | Young |
| 2012/0188246 | A1 | 7/2012 | Cheung et al. |
| 2012/0288139 | A1 | 11/2012 | Singhar |
| 2013/0063446 | A1 | 3/2013 | Lau et al. |
| 2013/0097519 | A1 | 4/2013 | Andersson et al. |
| 2013/0120401 | A1 | 5/2013 | Borysenko et al. |
| 2013/0124952 | A1 | 5/2013 | Frem et al. |
| 2013/0139072 | A1 | 5/2013 | Kaza et al. |
| 2013/0162664 | A1 | 6/2013 | Peacock et al. |
| 2013/0179761 | A1* | 7/2013 | Cho ......................... G06F 17/21 715/202 |
| 2013/0311984 | A1* | 11/2013 | Kaiwar ...................... G06F 8/65 717/172 |
| 2013/0339907 | A1 | 12/2013 | Matas et al. |
| 2014/0300647 | A1 | 10/2014 | Villegas et al. |
| 2015/0339841 | A1 | 11/2015 | Carter et al. |

FOREIGN PATENT DOCUMENTS

| | | |
|---|---|---|
| CN | 101882321 A | 11/2010 |
| CN | 101893980 A | 11/2010 |
| CN | 102044083 A | 5/2011 |
| CN | 102929491 A | 2/2013 |
| CN | 102999332 A | 3/2013 |
| EP | 1326165 A2 | 7/2003 |
| WO | 2011100599 A2 | 8/2011 |

OTHER PUBLICATIONS

Pinheiro, et al., "Introduction to Multithreaded Rendering and the Usage of Deferred Context in DirectX 11", In Proceedings of SBGames, vol. TB-02820/001_v01, Nov. 7, 2011, pp. 1-5.
Need, Dwayne, "Mitigating Airspace Issues in WPF Applications", Published on: Feb. 26, 2013, Available at: http://blogs.msdn.com/b/dwayneneed/archive/2013/02/26/mitigating-airspace-issues-in-wpf-applications.aspx.
"ID2D1CommandList Interface", Retrieved on: Aug. 16, 2013, Available at: http://msdn.microsoft.com/en-us/library/hh404392(v=VS.85).aspx.
"Combining XAML and DirectX", Published on: Mar. 15, 2012, Available at: http://blogs.msdn.com/b/windowsappdev/archive/2012/03/15/combining-xaml-and-directx.aspx.
"WPF Interoperation:"Airspace" and Window Regions Overview", Retrieved on: Aug. 16, 2013, Available at: http://msdn.microsoft.com/en-us/library/vstudio/aa970688(v=vs.90).aspx.
"Controls (XAML with C# or C++)", Retrieved on: Aug. 16, 2013, Available at: http://msdn.microsoft.com/en-us/library/windows/apps/bg182878.aspx.
Working with Animations Programmatically, Published on: May 13, 2010 Available at: http://msdn.microsoft.com/en-us/library/cc189069(v=vs.95).aspx . 8 pages.
Office Action dated Jul. 15, 2015 in U.S. Appl. No. 14/284,690 16 pages.
Performance Considerations in Applications for Windows Phone, Retrieved on: Sep. 12, 2011, http://msdn.microsoft.com/en-us/library/ff967560(v=vs.92).aspx, 23 pages.
Notice of Allowance dated Jun. 17, 2014 in U.S. Appl. No. 13/295,611 2 pages.
Notice of Allowance dated Mar. 12, 2014 in U.S. Appl. No. 13/295,611 8 pages.
Office Action dated Sep. 23, 2013 in U.S. Appl. No. 13/295,611 33 pages.
Office Action dated Mar. 12, 2013 in U.S. Appl. No. 13/295,611 39 pages.
PCT Second Written Opinion Issued in PCT Application No. PCT/US2015/016722, dated May 2, 2016, 11 Pages.
"Step by Step Tutorials for Microsoft Word 2002 Accessibility Options", Retrieved on: Sep. 14, 2011, http://download.microsoft.com/download/b/d/5/bd515214-0728-4a54-9625-ab3f198cf448/Word2002.doc, 59 pages.
Alexa, et al., "An Animation System for User Interface Agents", In Proceedings of WSCG, Feb. 5-9, 2001, pp. 154-160.
Euh, et al., "A Low-Power Content-Adaptive Texture Mapping Architecture for Real-Time 3D Graphics", In Proceedings of the 2nd International Conference on Power-aware Computer Systems, 2002, 11 pages.
PCT International Search Report and Written Opinion for PCT/US2012/064260 dated Feb. 28, 2013.
WPF Interoperation: "Airspace" and Window Regions Overview, Retrieved on: Sep. 14, 2011, http://msdn.microsoft.com/en-us/library/aa970688%28VS.90%29.aspx, 4 pages.
Word 2007 Tutorial—10 Working with Pictures, Aug. 3, 2009, https://www.youtube.com/watch?v=Jn3G2GTINa4. 2 pages.
"First Office Action and Search Report Issued in Chinese Patent Application No. 201210455485.4", dated Mar. 4, 2015, 12 Pages.
"Second Office Action and Search Report Issued in Chinese Patent Application No. 201210455485.4", dated Apr. 29, 2015, 13 Pages.
"Third Office Action Issued in Chinese Patent Application No. 201210455485.4", dated Sep. 25, 2015, 13 Pages.
Office Action dated Nov. 22, 2013 in U.S. Appl. No. 13/295,478 32 pages.
Office Action dated Jun. 27, 2014 in U.S. Appl. No. 13/295,478 28 pages.
Final Office Action dated Dec. 29, 2014 in U.S. Appl. No. 13/295,478 27 pages.
Notice of Allowance dated Jul. 22, 2015 in U.S. Appl. No. 13/295,478 9 pages.
Notice of Allowance dated Sep. 3, 2015 in U.S. Appl. No. 13/295,478 6 pages.

(56) References Cited

OTHER PUBLICATIONS

Notice of Allowance dated Oct. 29, 2015 in U.S. Appl. No. 13/295,478 6 pages.
"Fourth Office Action Issued in Chinese Patent Application No. 201210455485.4", dated Feb. 22, 2016, 10 Pages.
"First Office Action and Search Report Issued in Chinese Patent Application No. 201210455168.2", dated Jan. 28, 2015, 13 Pages.
"Second Office Action Issued in Chinese Patent Application No. 201210455168.2", dated Aug. 25, 2015, 6 Pages.
Notice of Allowance Issued in Chinese Patent Application No. 201210455168.2, dated Feb. 22, 2016, 5 Pages.
U.S. Appl. No. 14/284,690 Office Action dated Mar. 28, 2016 . 12 pages.
"International Preliminary Report on Patentability Issued in PCT Application No. PCT/US2015/016722", dated Aug. 31, 2016, 13 Pages.
U.S. Appl. No. 14/284,690 Office Action dated Aug. 26, 2016.
U.S. Appl. No. 14/284,690 Office Action dated Mar. 7, 2017, 18 pages.
U.S. Appl. No. 14/284,690 Office Action dated Mar. 17, 2017, 18 pages.
U.S. Appl. No. 14/284,690 Office Action dated Sep. 20, 2017, 16 pages.
Chinese Decision of Reexamination Issued in Patent Application No. 201210455485.4, dated May 27, 2017, 13 Pages.
"Office Action Issued in Chinese Patent Application No. 201580010299.1", dated Aug. 28, 2018, 17 Pages.

* cited by examiner

CROSS-PLATFORM RENDERING ENGINE

BACKGROUND

Software products that are available on multiple platforms (i.e., cross-platform products) provide larger user bases than single platform products. A software developer generally wants to provide a consistent user experience (i.e., look and feel) across those platforms so a user familiar with the software product on one platform will immediately feel comfortable with the same software product on another platform.

The mechanisms to display content on the screen differ widely between platforms running different operating systems. For example, some desktop operating systems do not include functionality to compose (i.e., combine) content from different applications on the screen. Instead, each application is responsible for creating and updating screen images and having them displayed. While some operating systems provide ways to compose content for display, each has its own unique way of accomplishing this task. The inconsistency requires the software developer to learn how to interface with each different operating system to which the software product is ported.

Beyond simply requiring the software developer to learn platform-specific implementations of graphics functions, the implementation differences may require substantial rewriting of code in an effort to replicate the user experience on different platforms. Each rewrite introduces the potential to introduce new errors and requires additional quality assurance testing. When an operating system does not provide the required functionality or performs the function differently than expected, it may be impracticable, if not impossible, to provide a consistent user experience on that platform.

Even when the functionality is replicated, the application may differ in efficiency and responsiveness among the various platforms. This may result from factors such as the software developer's different levels of familiarity and experience with each operating system, the strengths and weaknesses of the composition functionality available in the various operating systems, and hardware timing constraints.

Historically, in some applications, the user interface thread has been responsible for all functions of the application including applying the application logic and rules, handling inputs to the application, and presenting the application content to the user. The responsiveness of the application is based, at least in part, on how quickly the user interface thread processes inputs and renders changes to the application content. When rasterization is handled by the user interface thread, an application will appear unresponsive if the user interface thread is busy when content updates are needed because rasterization cannot occur until the user interface thread finishes its current task. To deal with the increased processing requirements associated with touch screens, dedicated application threads have been created to decouple the application responsiveness from the code driving the user interface.

Rendering of application content for display is still controlled by the application thread and does not benefit from this divide. If the application thread is busy performing an operation on the application content when rendering is needed, rendering will be delayed until the operation completes. The application may be perceived as being unresponsive if part of the application moves into a portion of the screen that has not been realized (i.e., rendered or updated) yet. This may occur when the application thread does not rasterize the application content within a few frames of the initial touch input. For example, in one operating system, it was noted that applications begin to appear unresponsive if the application thread does not rasterize the application content within approximately four frames of initiating a pan by swiping one's finger. Guaranteeing this level of responsiveness from the application thread at all times is difficult.

These problems continue throughout the life of the software product as updates and patches are developed. It is with respect to these and other considerations that the present invention has been made. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments provide for a system rendering and displaying computer-generated display components of user interfaces and content items. The system includes a computing device capable of graphically displaying application content to a user via a screen. The cross-platform rendering engine serves as an intermediary between the application generating the content and the compositor that displays the content on the screen. The cross-platform rendering engine allows consistent implementation of application functionality across various platforms which, in turn, results in a consistent user experience.

In addition to drawing content directly on surfaces maintained and displayed by a compositor, the application may draw content descriptions to the cross-platform rendering engine. The content descriptions are an intermediate representation between the original application content and the rasterized textures that are displayed on the screen. Each content description describes how to draw different pieces (e.g., rectangles) of application content and the relationship between those different pieces. The cross-platform rendering engine translates these descriptions into platform-specific display components for presentation on the screen. Embodiments of the cross-platform rendering engine may control and manipulate the rendering of the intermediate representations on behalf of the application to provide additional functionality and create a more responsive application.

When the application provides content descriptions rather than rasterized images of the application content itself, the cross-platform rendering engine can provide greater value. Because the content descriptions are typically much less expensive in terms of resource usage than the corresponding rasterized images, the cross-platform rendering engine is able to store more representations of application content than could be held as textures, which allows the cross-platform rendering engine to respond to user interaction in many instances instead of making calls back to the application. This provides significant opportunities to increase performance when rendering application content and improve responsiveness of the application.

To display content in a timely manner such that the application remains responsive to the user and minimizes the amount of user-perceptible lag between receiving a user input and updating the screen, the cross-platform rendering engine includes components running on different processing threads including the frontend running on the application thread and the backend running on the user interface thread. The application thread is a processing thread responsible for the primary functions of the application. Interactions between the application and the cross-platform rendering engine occur on the application thread. The user interface thread is a processing thread responsive to requests from the compositor and creates the display layers containing application content to which display images (e.g., bitmaps) are added. The efficiency and responsiveness provided by the cross-platform rendering engine is achieved through the use of stored content descriptions and a pull model to obtain content from the application. Instead of making the application push updates to the compositor, the backend pulls updates from the application when an area needs visual update.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation or an implementation combining software and hardware aspects. The following detailed description is, therefore, not to be taken in a limiting sense.

Various embodiments of a cross-platform rendering engine are described herein and illustrated in the accompanying figures. The cross-platform rendering engine serves as an intermediary between the application and the operating system for storing instructions describing application content allowing software developers to write platform-agnostic application code. The application sends content to the cross-platform rendering engine in the form of content descriptions that may be used to render rasterized images of the application content for display. In the event that a content description corresponding to the texture needed by the compositor is not available, the cross-platform rendering engine pulls the content description from the application. The cross-platform rendering engine may rasterize images from the content descriptions on a user interface thread on behalf of the application rather than waiting for the application thread improving the overall responsiveness of the application and contributing to a better user experience. Embodiments of the cross-platform rendering engine may change the appearance of the application content by manipulating the stored content descriptions on behalf of the application prior to rendering the rasterized images to the compositor.

Figure 1:
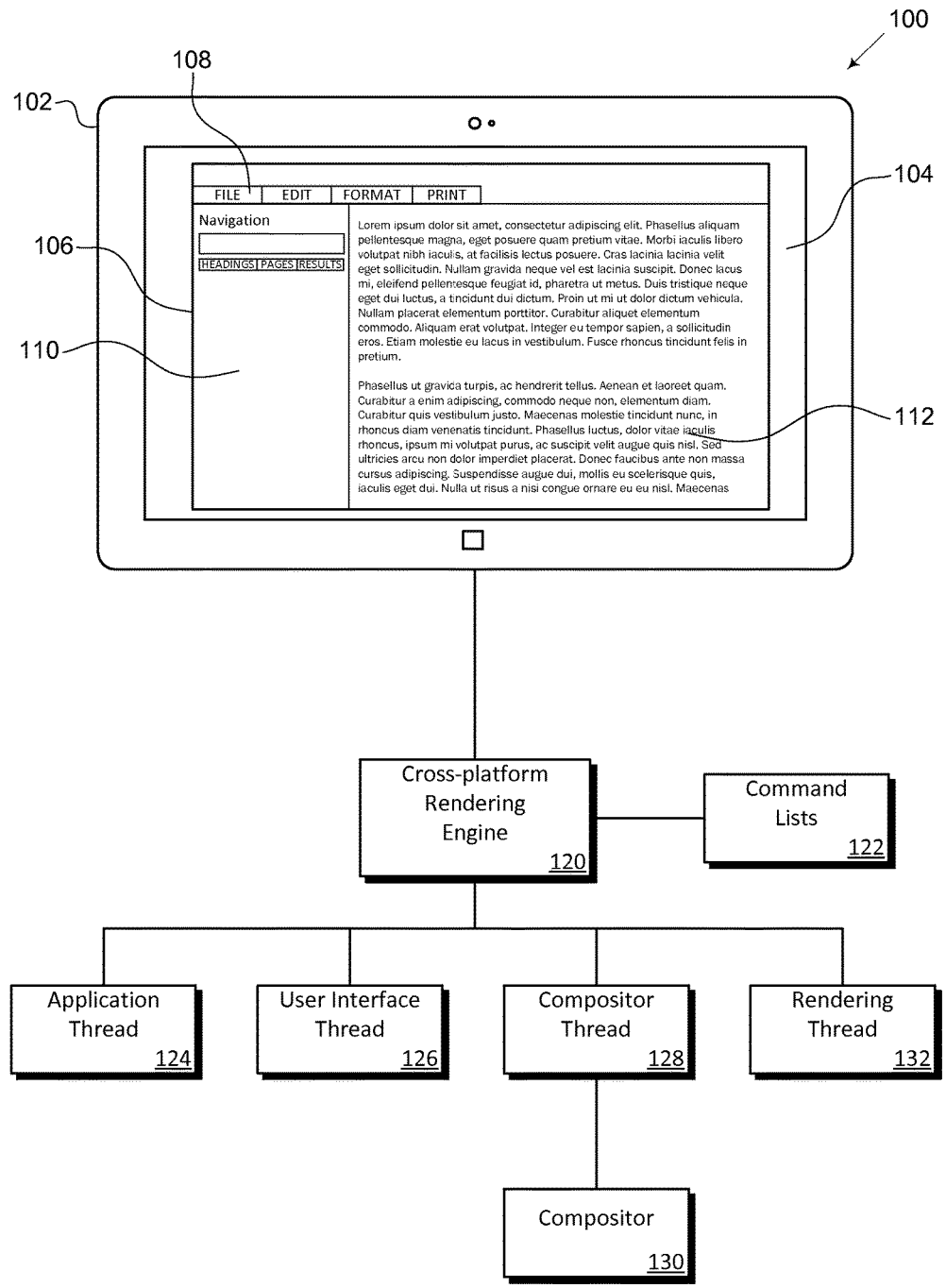
FIG. 1 a block diagram of one embodiment of a system for rendering and displaying computer-generated display components of user interfaces and content items.

FIG. 1 is a block diagram of one embodiment of a system for rendering and displaying computer-generated display components of user interfaces and content items. The system 100 includes a computing device 102 capable of graphically displaying application content to a user via a screen 104. Examples of suitable computing devices include, but are not limited to, desktop computers, laptops, tablet or surface computers, smart phones, and smart appliances. In various embodiments, the screen may also include a digitizer to receive touch inputs from the user via stylus (e.g., the user's fingers or a digital pen).

An example software application user interface and example associated user content are displayed on the display surface 104. The user interface 106 (i.e., application) is illustrative of user interfaces and associated user content enabled by a variety of software applications including, but not limited to, word processing applications, spreadsheet applications, slide presentation applications, electronic mail applications, note applications, and calendaring applications. That is, the user interface 106 is illustrative of any graphical display components that may be displayed onto a computer-enabled display surface 104 for review and use according to associated software application functionality.

The user interface 106 is illustrative of a word processing application user interface having a plurality of controls 108, a service pane 110, and a user content display area 112. As should be understood, the illustrated user interface 106 is for purposes of example only and is not limiting of the vast number and types of graphical display components that may be displayed and managed according to embodiments of the invention described herein.

The cross-platform rendering engine 120 is illustrative of a software application that maps platform-specific requests and responses to platform-agnostic requests and responses. These requests and responses are used to present display components of a software application user interface (UI) (e.g., buttons, controls, search functions, help functions, menus, or toolbars) and user content (e.g., text, documents, photographs, images, or charts) on the computer-enabled display surface 104. For convenience, the display components of the software application user interface and user content consumed by the application are individually and collectively referred to as application content.

The cross-platform rendering engine serves as an intermediary between the application generating the content and the compositor that displays the content on the screen. The cross-platform rendering engine 120 enables the creation of descriptions of application content as content descriptions 122 from which display images such as bitmaps representing various display components, may be created using platform-specific commands. This allows application code for drawing application content to be reused on different platforms without modification or, in some cases, limited modification compared to writing platform specific application code. In addition, the cross-platform rendering engine 120 may be operative to manipulate the display layers and re-render the application content on behalf of the application. The cross-platform rendering engine allows consistent implementation of application functionality across various platforms which, in turn, results in a consistent user experience.

The content descriptions are an intermediate representation between the original application content and the textures (i.e., raster images) that are displayed on the screen. In addition to drawing content directly on surfaces maintained and displayed by a compositor, the application may draw to the cross-platform rendering engine in the form of content descriptions. Each content description describes how to draw different pieces (e.g., rectangles) of application content and the relationship between those different pieces. The cross-platform rendering engine translates these descriptions into platform-specific display components for presentation on the screen. In various embodiments, the content descriptions may be platform-specific or platform-agnostic. For example, the content descriptions may be written as sequences of platform-specific graphic library commands (e.g., Direct2D or Direct3D Command Lists), platform-agnostic vector graphic descriptions (e.g., paths), or other platform-specific or platform-agnostic content description languages, objects, or structures.

Because the content descriptions are descriptions of the application content from which the application content can be rendered rather than rasterized images of the application content itself, the content descriptions are inexpensive in terms of resource usage. In most instances, the content descriptions consume significantly fewer resources than the corresponding texture content they represent. For applications such as, but not limited to, word processors, spreadsheet applications, presentation applications, email clients, calendaring applications, task management applications, and web browsers, the majority of content in a given document is simple enough that the content descriptions are between approximately 50 to approximately 100 times more efficient than the corresponding texture content in terms of memory usage. Examples of simple content efficiently handled with content descriptions generally include, but are not limited to, text runs, paths (i.e., vector graphics), and small icons/figures (e.g., low resolution and/or color depth raster images). Because content descriptions are resource efficient, the cross-platform rendering engine is able to store more representations of application content than could be held as textures, which allows the cross-platform rendering engine to respond to user interaction on behalf of the application in many instances instead of making calls back to the application. This provides significant opportunities to increase performance when rendering application content and improve responsiveness of the application.

Additionally, the content descriptions are stored in main memory rather than video memory, which is significant because the storage capacity of video memory is limited compared to main memory in most computing devices. As a result, the cross-platform rendering engine can keep a greater number of intermediate representations available than could be stored by the compositor. While the content descriptions can hold complex content (e.g., 3D graphics), the efficiency gains are reduced because the complex content must be rasterized before being referenced in the content description and the content description would simply reference the bitmap or surface containing the raster image. The content description may be implemented as control in a visual presentation markup language, such as the Extensible Application Markup Language (XAML).

To display content in a timely manner such that the application remains responsive to the user and minimizes the amount of user-perceptible lag between receiving a user input and updating the screen, the cross-platform rendering engine includes components on running on different processing threads including an application thread 124 and a user interface thread 126. Although described in the singular, more than one of any of the threads described herein may be used.

The application thread 124 is a processing thread responsible for the primary functions of the application including the original generation of application content. Interactions between the application and the cross-platform rendering engine occur on the application thread. The user interface thread 126 is a processing thread responsive to requests from the compositor and creates the display layers containing application content to which display images (e.g., bitmaps) are added. In addition, the user interface thread 126 may assume responsibility for processing animation behaviors added to layers (e.g., moving objects, reacting to movement of other objects, resizing objects, panning or zooming the viewport) and/or for changing layers properties. For example, in a word processing application, the user interface thread 126 may be responsible drawing a document on a display layer, placing a cursor on the document, and then setting properties on the cursor to allow movement of the cursor around the document.

The compositor thread 128 is a processing thread responsible for receiving display layers and property changes from the user interface thread. According to one embodiment, the cross-platform rendering engine sends the display layers to a compositor 130 that brings visual display components (i.e., textures) from different sources together in order to create a combined image in a virtual texture. Consider, for example, each control may be an individual layer. The user interface thread creates all of these individual layers and places all the controls (i.e., display components) on the layers. The user interface thread then sends the layers over to the compositor 130 and the compositor assembles all the layers together into a virtual texture representing the tool bar and associated buttons/controls.

Compared to the application thread, which handles the majority of application functions, less processing occurs on the user interface thread allowing faster to drawing requests from the compositor. In other words, because of the division of responsibilities, the user interface thread has higher guaranteed availability and is able to quickly draw display components to the screen 104 as needed. For example, in one representative operating system running on a typical computing device, the nominal response time for the user interface thread is less than approximately 50 ms. In contrast, the nominal response time for the application thread on the same system is approximately 200 ms.

In various embodiments, complex work and application-specific logic, including manipulation and rendering, may be conducted off the user interface thread to keep the user interface thread highly responsive. Accordingly, embodiments of the cross-platform rendering engine may include a rendering thread 132 for playback of content descriptions to help maintain the responsiveness of the user interface thread. Moving content description playback to the rendering thread isolates any expensive rendering from having an impact on the user interface thread. In other words, the user interface thread will not be occupied with drawing display components to the screen 104 and will be freer to respond to input and manage drawing requests from the compositor.

Figure 2:
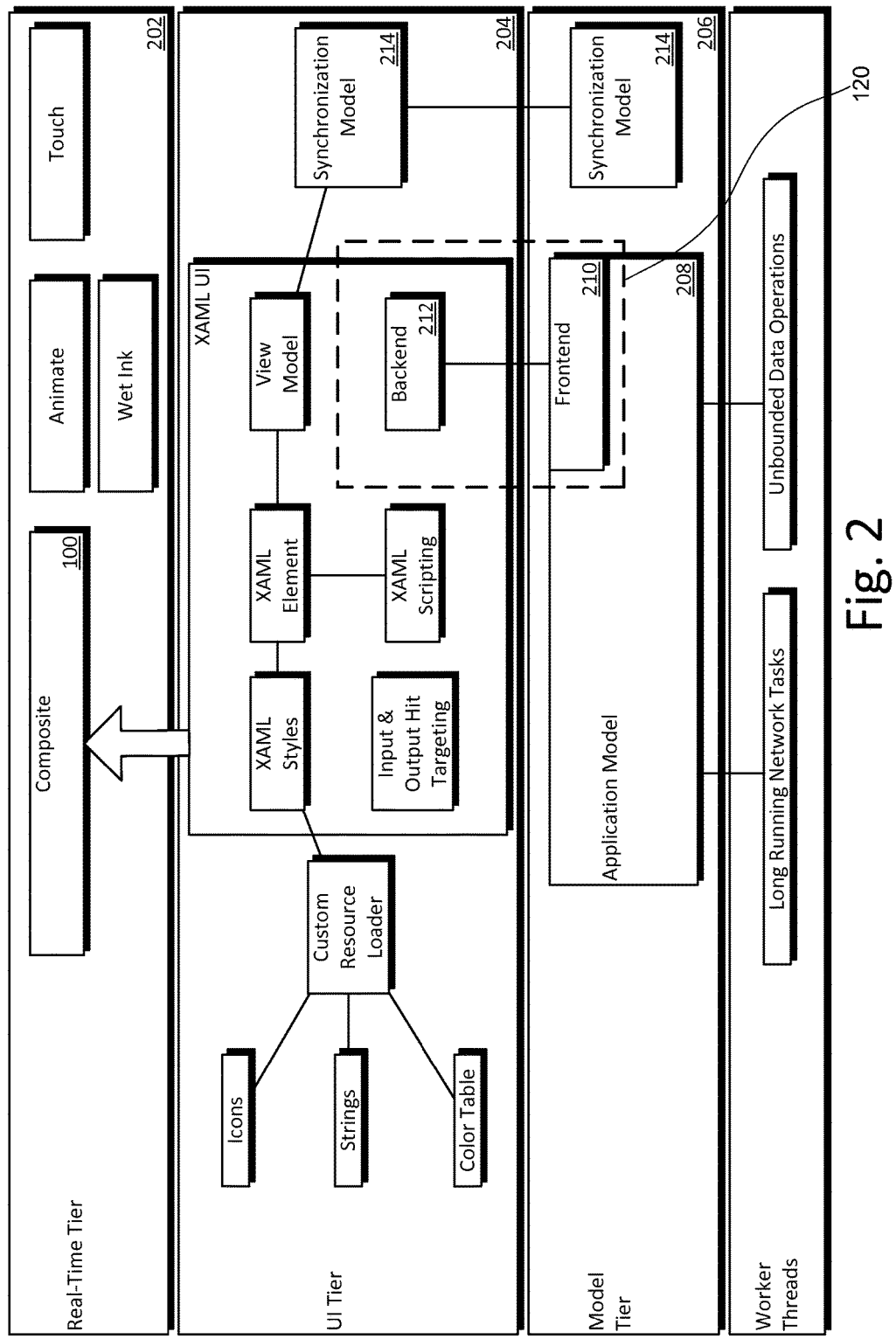
FIG. 2 is a high level system architecture diagram showing one embodiment of a system suitable for implementing the cross-platform rendering engine.

FIG. 2 is a high level system architecture diagram showing one embodiment of a system suitable for implementing the cross-platform rendering engine. The system includes a real-time tier 202, a user interface tier 204, and a model tier 206. Each tier generally runs in a different process space than the other tiers. The real-time tier is responsible for interactions at the hardware level such as receiving user inputs and presenting application content to the screen for display. The user interface tier includes the components permitting data entry (e.g., entry of user-generated content) and user access to the functionality of the application (e.g., interacting with application controls) and presenting data to the user (e.g., displaying application content). The user interface thread 126, the compositor thread 128, and the rendering thread 132 are associated with the user interface tier.

The model tier includes the application model 208 which exposes the functionality of the application, provides application logic and business rules (e.g., how to paginate and hyphenate), stores application content, and renders application content for display. The application thread 124 is associated with the model tier. The cross-platform rendering engine includes a frontend 210 running in the model tier and a backend 212 running in the user interface tier. The synchronization model 214 provides asynchronous communication and shared data that allows the application code to remain in synchronization across the different threads. Worker threads provide processing for the application model.

Figure 3:
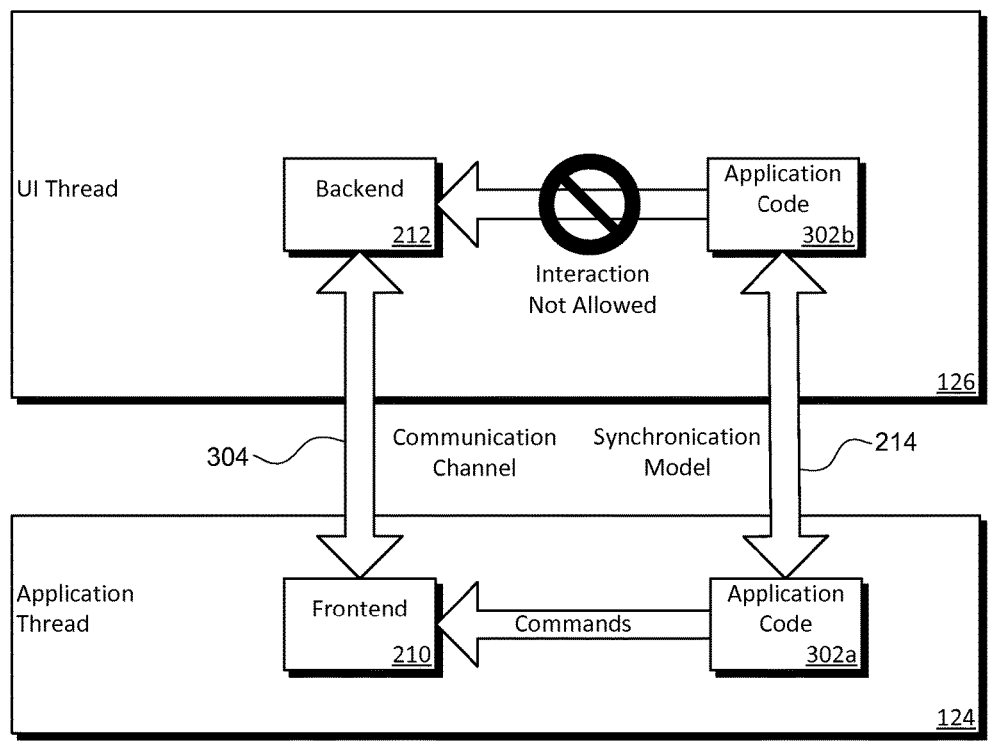
FIG. 3 is flow diagram showing one embodiment of the interactions between the cross-platform rendering engine and the application.

FIG. 3 is flow diagram showing one embodiment of the interactions between the cross-platform rendering engine and the application. The frontend provides the interface used by the application to generate the intermediate representations of the application content for eventual display. The backend provides the interface to the compositor. That is, the backend receives requests to display application content from the compositor and responds by generating raster images of the application content (i.e., virtual textures) and transferring the virtual textures to display surfaces that may presented on the display screen.

The application must invoke commands on the backend from a thread other than the user interface thread. Even though the backend lives on the user interface thread, application code 302b running on the user interface thread may not access the backend directly. All calls to the backend must be made through the cross-platform rendering engine channel architecture 304. The cross-platform rendering engine channel architecture is a dedicated and direct communication channel between the frontend and the backend. For example, the content descriptions drawn to the frontend by the application code 302a running on the application thread are transferred to the backend via the cross-platform rendering engine channel architecture.

The backend runs on a dedicated user interface thread and has a high responsiveness allowing quick response to drawing requests from the compositor. The efficiency and responsiveness provided by the cross-platform rendering engine is achieved through the use of stored content descriptions and a pull model to obtain content from the application. Instead of making the application push updates to the compositor, the backend pulls updates from the application when an area needs visual update. When the content descriptions needed to respond to a drawing request are available, the cross-platform rendering engine renders the content from the content descriptions without involving the application thread. If the necessary content descriptions are unavailable, the cross-platform rendering engine sends a drawing request to the application. When the application responds by creating a content description, the backend immediately renders the content for the compositor and stores the content description for later usage.

The backend maintains the authoritative thread state for the cross-platform rendering engine. The cross-platform rendering engine channel architecture allows the frontend to set properties and makes changes the layer tree on the backend but does not provide access to the backend state data. The frontend maintains its own version of the layer tree and textures pointers. As a result, the frontend and backend states may not be synchronized at any particular point in time. This potential for the frontend and backend states to be out of sync is not significant due to the pull model employed by the cross-platform rendering engine.

In various embodiments, communication between the application and the cross-platform rendering engine occurs in the model tier. The backend passes the request to the frontend, and the frontend sends the request to the application thread. In other embodiments, the backend may send the request directly to the application. In response, the application thread draws a responsive content description to the frontend. Interaction is not allowed between the application and the backend on the user interface thread. Because the application cannot send changes to both the frontend and the backend, changes, the frontend and backend states will eventually stabilize with the backend state matching what has been sent from the frontend.

Applications may draw content descriptions to the frontend using various device contexts. The backend uses another device context when rasterizing content descriptions to the associated virtual texture. By using different device contexts at the frontend and the backend, the cross-platform rendering engine may play and record content descriptions at the same time. Because each virtual texture is given a single device context, the cross-platform rendering engine rasterizes the content descriptions associated with the virtual texture in sequence (i.e., drawing is serialized). In various embodiments, the device context of a given virtual texture is used to associate content descriptions with that virtual texture.

In some embodiments, the compositor controls the communication between the backend and the frontend. The compositor may throttle the requests of content descriptions depending on the type of request. Outstanding draws can have up to three requests in flight at a time. Other types of requests may be done one at a time to ensure responsiveness if a major change happens to the viewport.

The cross-platform rendering engine maintains or improves the responsiveness the application by rasterizing the content represented in the content descriptions in the user interface thread. The cross-platform rendering engine rasterizes the content descriptions into virtual textures (i.e., content description virtual textures) which are provided to the compositor. Each content description is associated with a selected virtual texture and represents a specific area within the associated virtual texture. The selected area may be a portion of the virtual texture or the entire virtual texture. The cross-platform rendering engine plays the associated content descriptions in sequence to compose the final raster image held by the virtual texture. Embodiments of the cross-platform rendering engine may optionally perform some rasterization on the application thread.

In some embodiments, the cross-platform rendering engine provides a backend texture class to hold the virtual textures. The backend texture class contains logic to serialize access to the compositor, which allows only one outstanding draw at a time. For example, the serialization logic locks access to the draw commands while a draw to the compositor is in progress. In one embodiment, the user interface thread attempts to obtain a lock. If successful, the user interface thread draws the content. If not, the user interface thread schedules work on the application thread. This ensures that the content gets drawn in correct order, at the expense of a potential loss of responsiveness due to involvement of the application thread. In other embodiments, any rendering on the application thread uses an intermediate surface pool. The intermediate surfaces are then marshaled to the user interface thread for transfer to the compositor. This ensures that only the user interface thread is drawing to the compositor.

During invalidations and updates, the cross-platform rendering engine may trim content descriptions whose content is overwritten by a content description appearing later in the sequence. In various embodiments, the cross-platform rendering engine removes overwritten content descriptions from the sequence of content descriptions associated with that virtual texture but retains the content description for possible future use (e.g., during undo operations). In some embodiments, overwritten content descriptions are discarded. The cross-platform rendering engine may optionally trim content descriptions at the command level to remove specific commands whose content has been overwritten while retaining commands whose content has not been overwritten.

The cross-platform rendering engine tracks the current state of each virtual texture (i.e., virtual texture state). The virtual texture state indicates the areas of the virtual texture that have one or more associated content descriptions. Applications may request the current virtual texture state and use the information to update the application content. For example, the application may identify areas of the virtual texture that do not have an associated content description and provide content descriptions for those areas when the application thread is not busy. In various embodiments, the virtual texture state is not guaranteed to be completely up-to-date; however, the virtual texture state still provides useful information even when the current virtual texture state lags behind the actual virtual texture state and will be updated as the backend content descriptions change.

The cross-platform rendering engine may store content descriptions in wrappers allowing the content description to be annotated with auxiliary information. In various embodiments, the wrapper contains all content descriptions associated with a single virtual texture (i.e., a collection of content descriptions) and includes auxiliary information about the virtual texture and/or the included content descriptions. In other embodiments, each content description has its own wrapper and the wrapper includes auxiliary information specific to the content description.

The cross-platform rendering engine may store also content descriptions used to compose a virtual texture in a collection (i.e., a content description composite) that handles fundamental operations applicable to the content descriptions. Embodiments of the content description composite provide content description reconciliation. The cross-platform rendering engine considers a content description composite to be inefficient when a pixel or pixels are overdrawn by a selected number of content descriptions (e.g., three or more) while composing the virtual texture. As the number of content descriptions overdrawing the same pixels increases, so does the composition inefficiency. Accordingly, the cross-platform rendering engine reconciles the content descriptions by requesting a new content description for the bounding rectangle encompassing the content descriptions that overdrew the pixel to reduce drawing costs. In some embodiments, the cross-platform rendering engine requests a new content description each time the selected number of content descriptions draw to the same pixel or pixels. In other embodiments, the cross-platform rendering engine performs content description reconciliation only after all content descriptions in the content description composite have been drawn. The content description composite may optionally be used for tiling of large virtual textures to improve performance.

Figure 4A:
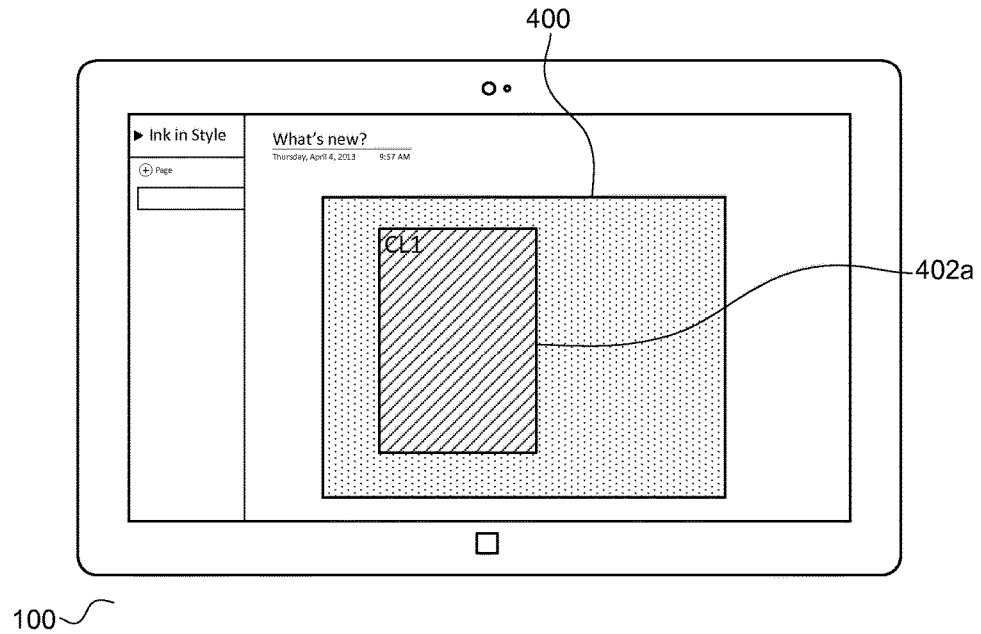
FIGS. 4A-D illustrate an example of content description reconciliation for a content description composite containing three content descriptions.
Figure 4B:
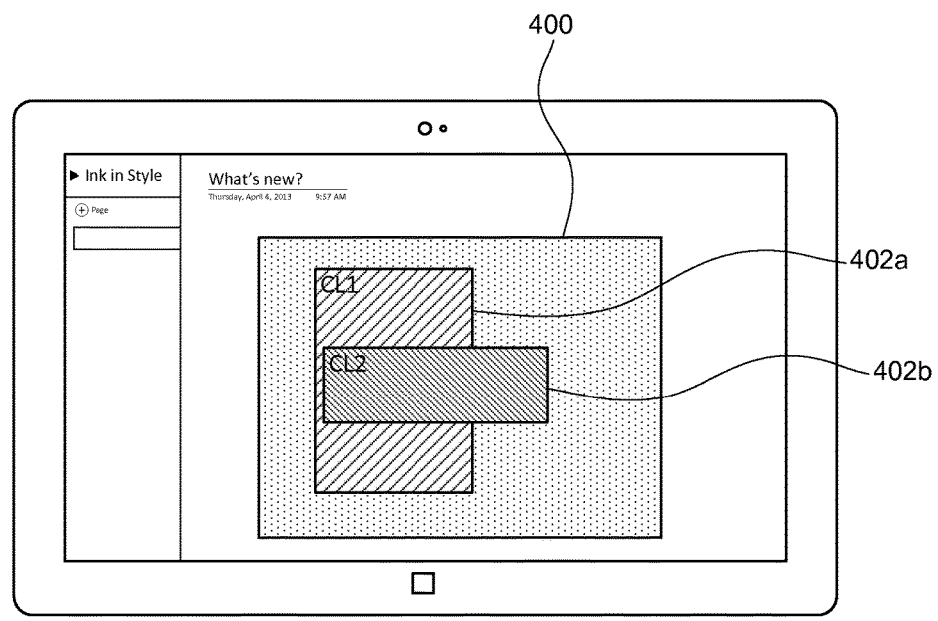
Figure 4C:
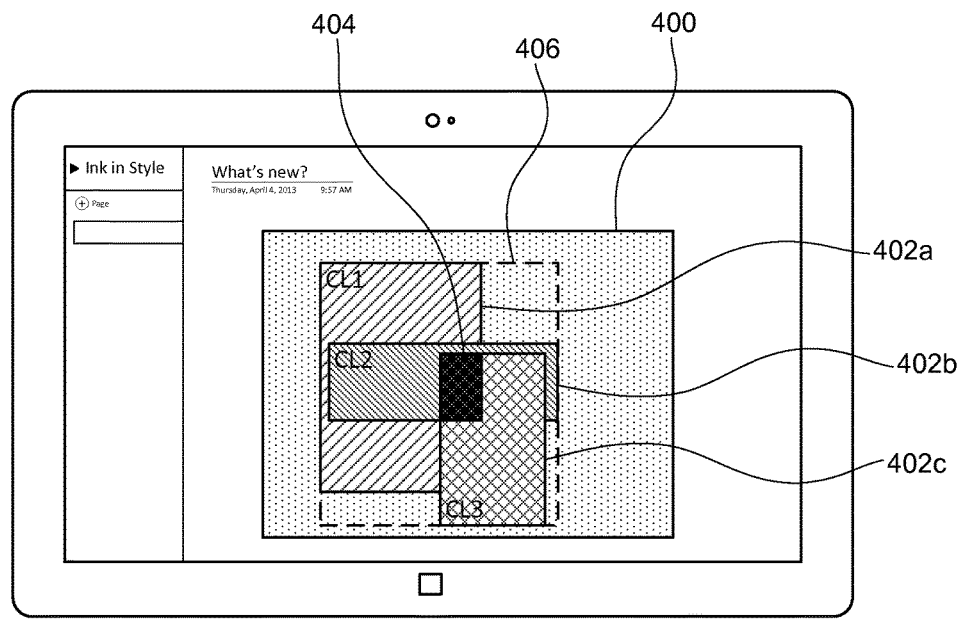
Figure 4D:
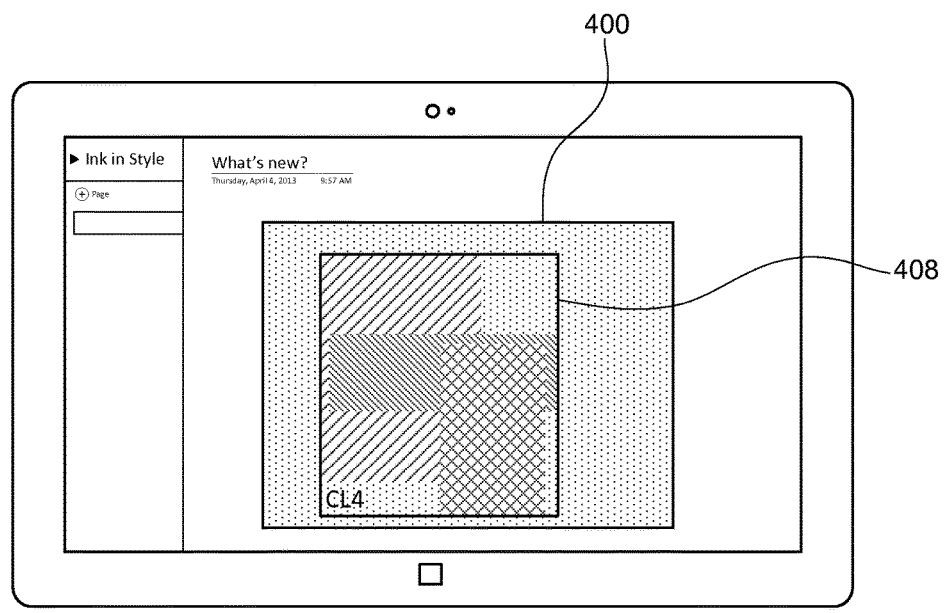

FIGS. 4A-D illustrate an example of content description reconciliation for a content description composite containing three content descriptions. FIG. 4A shows the virtual texture 400 after drawing content in a first rectangle 402*a* described by the first content description from the content description composite. FIG. 4B shows the virtual texture after rendering a second content description that produces a second rectangle 402*b* partially overlapping the first rectangle. FIG. 4C shows the virtual texture after rendering a third content description that produces a third rectangle 402*c* partially overlapping both the first and second rectangles. With recognition that the pixels in common area of overlap 404 have been redrawn three times, the cross-platform rendering engine requests a new content description describing the content in the box 406 bounding the three rectangles that drew to the common area of pixels. FIG. 4D shows the virtual texture 400 after drawing the content described by the new content description 408 that replaces the original three content descriptions 402*a*, 402*b*, and 402*c*.

The frontend exposes the functionality (i.e., the methods) of the cross-platform rendering engine to the application in the model tier. The cross-platform rendering engine exposes the same base API on all platforms. In various embodiments, the frontend exposes some or all of the methods for setting and retrieving properties of, adding, removing, and updating virtual textures including, but not limited to, Invalidate, InvalidateRect, InvalidateRegion, UpdateRect, Update, GetFullUpdateRegion, GetNumbeOfUpdateRects, GetUpdateRect, GetUpdateRects, SetDpi, BeginDrawGdi, BeginDrawDirect2d, EndDraw, EndPartialDraw, Copy, Copy, Resize, GetDpi, GetContentRect, SetPrefetchSize, and SetDirect2DTransformIncludesTextureOffset.

Embodiments of the API may optionally offer additional functionally on certain platforms. Additional functionality may be based on unique capabilities available on a certain platform or simply due to a willingness to invest more heavily in a certain platform (e.g., a platform having a significant market share). It should be appreciated that feature parity between platforms is not required for the cross-platform rendering engine to enhance the ability to easily port applications and provide a consistent user experience. Stated differently, the cross-platform rendering engine need not be limited to the lowest common denominator. To the extent that the cross-platform rendering engine does not offer some features on a certain platform, the option to write platform-specific code remains available and the benefit of any platform-agnostic code written against the base API still applies.

The pull model allows the cross-platform rendering engine to request the application content to provide content descriptions before they are required. Prefetching content allows the cross-platform rendering engine to have content descriptions available to respond to certain operations and allows the application to appear responsive even if the application thread is busy with other tasks (e.g., recalculating a spreadsheet, saving a recovery file, or synchronizing files to cloud based storage) when the operation is invoked by the user. The cross-platform rendering engine will prefetch selected amounts of application content in the horizontal and/or vertical directions (i.e., the prefetch boundary). The application may customize how much application content in the horizontal and/or vertical directions that the cross-platform rendering engine should prefetch by default. The prefetch boundary determines the minimum amount of application content that is cached by the cross-platform rendering engine; however, more application content may be cached if sufficient resources are available. In some embodiments, the cross-platform rendering engine adjusts the amount of application content cached based on the operation. For example, if the user performs a flick gesture or interacts with the vertical scroll bar a larger amount of vertically-offset application content may be cached than if the user is pressing the up or down arrow on the keyboard or uses a long touch to scroll the screen.

Scrolling operations present one example of a scenario where prefetching may be used. During scrolling, a scrolling layer considers all child layers that have a virtual texture. This occurs during scrolling notifications in the backend. Recalculation of the application content that should be cached may occur only after a certain distance has been scrolled. The scrolling layer has the ability request virtual textures it wishes to prefetch and to trim any content description composites that are outside the prefetch boundary.

Figure 5A:
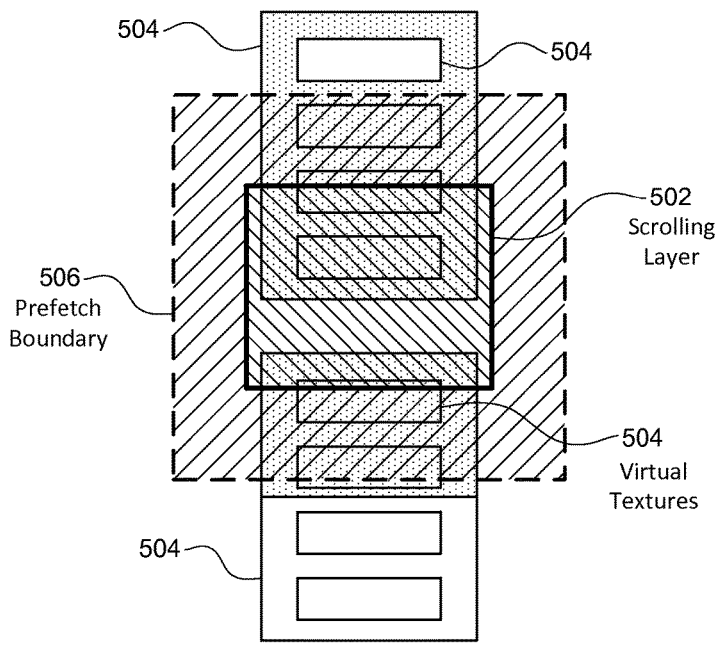
FIG. 5A illustrates an example of the virtual texture content descriptions available for caching given a selected prefetch boundary in a document having multiple virtual textures.

FIG. 5A illustrates an example of the virtual texture content descriptions available for caching given a selected prefetch boundary in a document having multiple virtual textures. Around a scrolling layer 502, a number of virtual textures 504 are arranged. The prefetch boundary 506 surrounding the scrolling layer contains some or all of a number of the virtual textures 504. In order to be available for caching, at least some of the virtual texture and the area of the prefetch boundary must overlap. The cacheable virtual textures are indicated by shading. In instances where the portion of the virtual texture that lies outside the prefetch boundary is relatively small, the cross-platform rendering engine may cache the entire virtual texture.

Figure 5B:
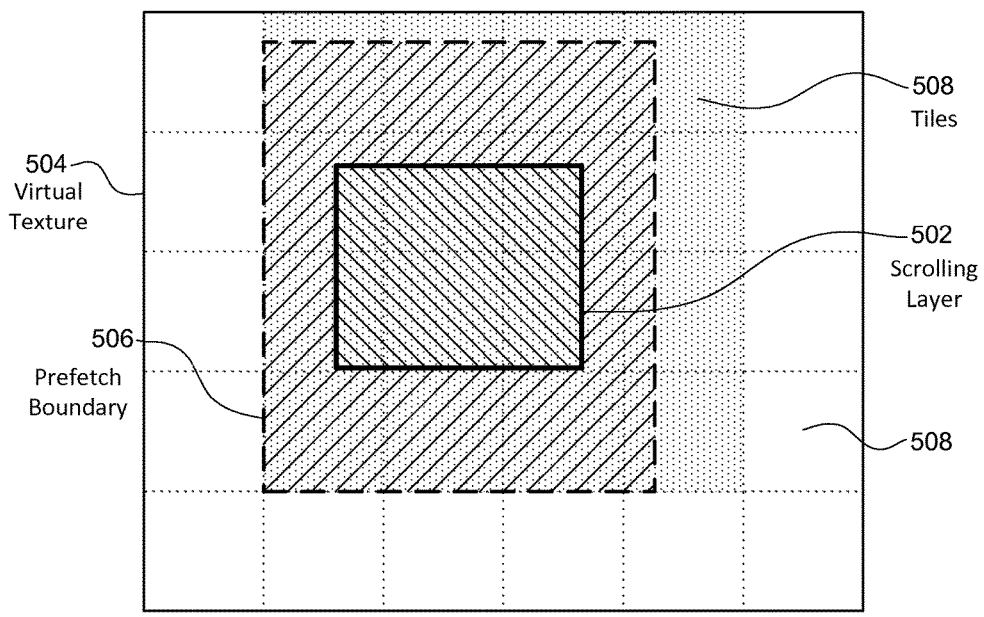
FIG. 5B illustrates an example of the virtual texture content descriptions available for caching given a selected prefetch boundary in a document having a single virtual texture composed of multiple tiles.

FIG. 5B illustrates an example of the virtual texture content descriptions available for caching given a selected prefetch boundary in a document having a single virtual texture composed of multiple tiles. The prefetch boundary surrounding the scrolling layer contains at a part of a number of tiles 508 in the virtual texture. The tiles in the virtual texture available to be cached are indicated by shading. In this instance, the tile size is relatively small so the entire tile is cached for any tile that is partially contained by the prefetch boundary.

A zoom action is an example of a manipulation that may be performed by the backend without requiring the involvement of the application. When a zoom action occurs for an area covered by one or more stored content descriptions, the cross-platform rendering engine is able to quickly respond on the user interface thread and create a clear texture. This is due to the fact that the description in the content description contains information about the application content (e.g., the text and paths) needed to draw the raster image instead the actual a raster image separated from the original context. For example, the cross-platform rendering engine may apply a scaling factor when rending the content descriptions for the zoomed area. Although there will be instances when the cross-platform rendering engine does not have the content descriptions for the zoomed area available and a drawing request must be made the application, such instances can be expected to be infrequent because resource efficiency allows the cross-platform rendering engine to retain a large number of content descriptions.

As a practical matter, a zoom action based on application content originally rendered as a texture cannot match the efficiency provided by the cross-platform rendering engine. Without requesting the application to update the texture, the texture-based zoom action would be performed using a lossy resize algorithm. This would typically result in a blurrier image due to insufficient information in the texture. Additionally, the resize algorithm will generally be more computationally intensive than applying a scaling factor. A clearer image could be obtained by requesting the application to draw the zoomed application content. Each time the zoom level changes, the application would be required to redraw the zoomed area. In contrast, the cross-platform rendering engine is able to render the same content descriptions again using a different scaling factor without loss of detail.

In scenarios where the application content is rendered on behalf of the application based on stored content descriptions, the cross-platform rendering engine may provide a notification to the application. The notification provides the application with an opportunity to make changes to the application content. In other words, the application may update the application content, after the fact, at such time when the application thread is free. In the meantime, the response by the cross-platform rendering engine provides the application content in a way that is consistent with the expectations of the user and in a timely manner that provides the user with the sense that the application is responsive.

Various embodiments of the cross-platform rendering engine provide different blending operations allowing the application to describe the type of blending in the content descriptions for use when rendering for overlapping textures. Examples of such blend modes include normal blend, subinverse blend, and inverse blend. The availability of a particular blending mode may depend upon the functionality available for the specific platform.

Figure 6A:
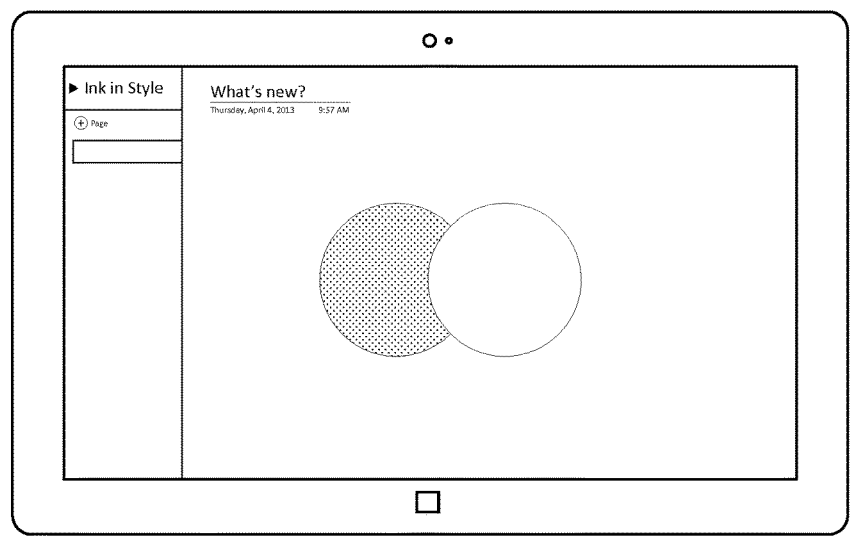
FIG. 6A illustrates an example of application content rendered from a content description using a normal blend mode.
Figure 6B:
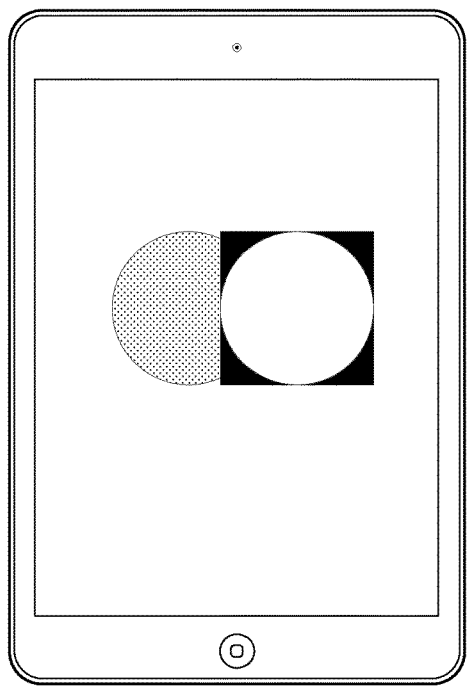
FIG. 6B illustrates the resulting virtual texture without normal blend mode support.

FIG. 6A illustrates an example of application content rendered from a content description using a normal blend mode. The normal blend mode provides standard transparency (i.e., alpha channel) support when playing back a content description. Consider the example of content descriptions containing commands to draw two overlapping circles. The circles do not occupy the full rectangular region that is described by the content description. To fully render the area associated with the content description, the circle and the unoccupied portion of the region (i.e., the background) must also be rendered. Using normal blend mode support, the cross-platform rendering engine renders the unoccupied portion of the region so that the background is treated as transparent when composited into the virtual texture (e.g., setting the alpha channel). In other words, the background of later-rendered content descriptions will not obscure the content from the previously-rendered content descriptions. In various embodiments, the cross-platform rendering engine may employ varying levels of transparency. FIG. 6B illustrates the resulting virtual texture without normal blend mode support where the background is rendered using a default fill color that obscures the area around the second circle.

Figure 7A:
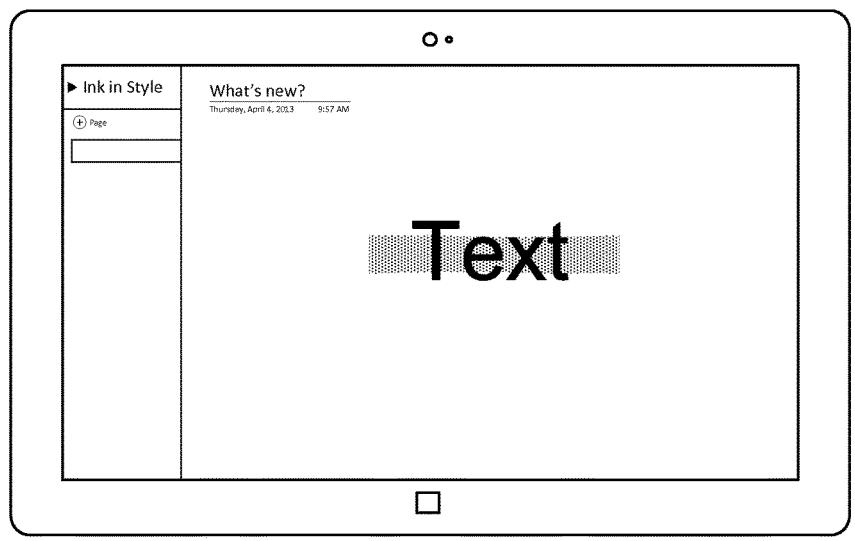
FIG. 7A illustrates an example of application content rendered from a content description using a subinverse blend mode.
Figure 7B:
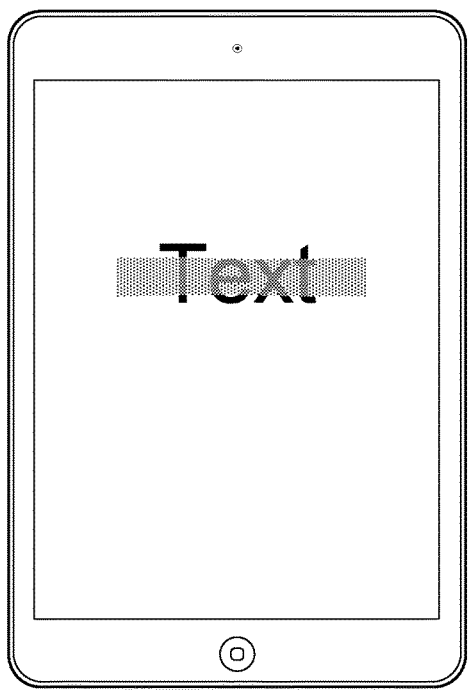
FIG. 7B illustrates the resulting virtual texture without subinverse mode support.

FIG. 7A illustrates an example of application content rendered from a content description using a subinverse blend mode. The subinverse blend mode provides "darken only" support when playing back a content description. Consider the example of content descriptions containing commands to highlight text. A first content description may describe the text and a second content description may describe a filled path representing highlighting that will overlap the text when composited. On light (e.g., white) paper with dark print, a highlighter colors the light paper but has no perceivable effect on the dark print. Using subinverse mode support, the cross-platform rendering engine instructs the compositor to composite the textures in such a way that the color of same pixels drawn by different content descriptions will only darken. In some embodiments, the darker color drawn to the same pixel is preserved. In some embodiments, when two colors drawn to the same pixel combine to make a darker color different from either of the original colors, the new color is retained and when a lighter color results, the darker of original colors is preserved. This allows the cross-platform rendering engine to produce realistic highlight effects. FIG. 7B illustrates the resulting virtual texture without subinverse mode support where the portion of the pixels containing text overlapped by the path become lighter as a result of averaging the colors drawn to the same pixel or applying transparency to the path and fill representing the highlight.

Figure 8A:
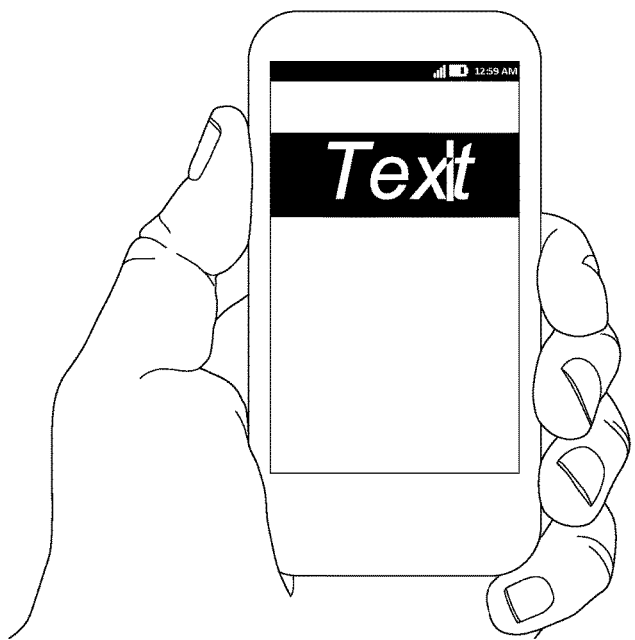
FIG. 8A illustrates an example of application content rendered from a content description using an inverse blend mode.
Figure 8B:
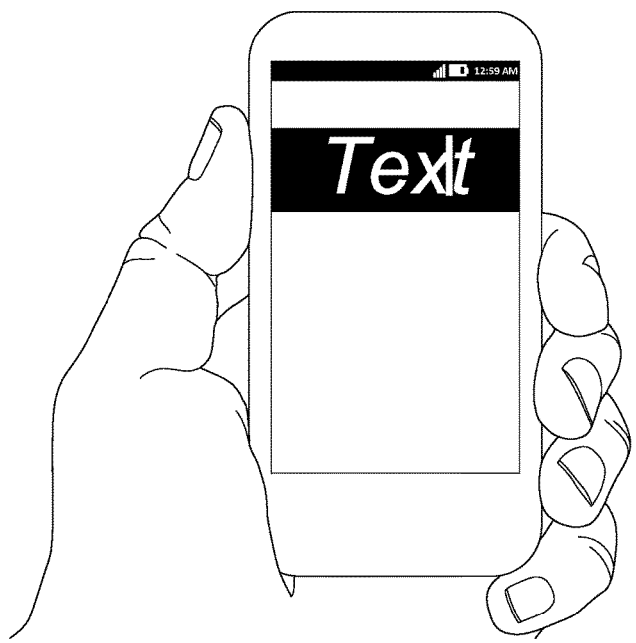
FIG. 8B illustrates the resulting virtual texture without inverse mode support.

FIG. 8A illustrates an example of application content rendered from a content description using an inverse blend mode. The inverse blend mode reverses the background when playing back content description to ensure the contents are always visible. Consider the example of content descriptions containing commands for displaying a caret to show the current location for text entry on a dark background. A first content description may describe the text and a second content description may describe the caret and associated animations (e.g., blinking) When rendered and composited together, any portion of the text overlapped by the caret take on the reverse of the color of the caret (e.g., white becomes black) so the text does not appear to be clipped. FIG. 8B illustrates the resulting virtual texture without inverse mode support where the portion of the text overlapped by the caret is obscured by the caret and appears to have been clipped.

Figure 9:
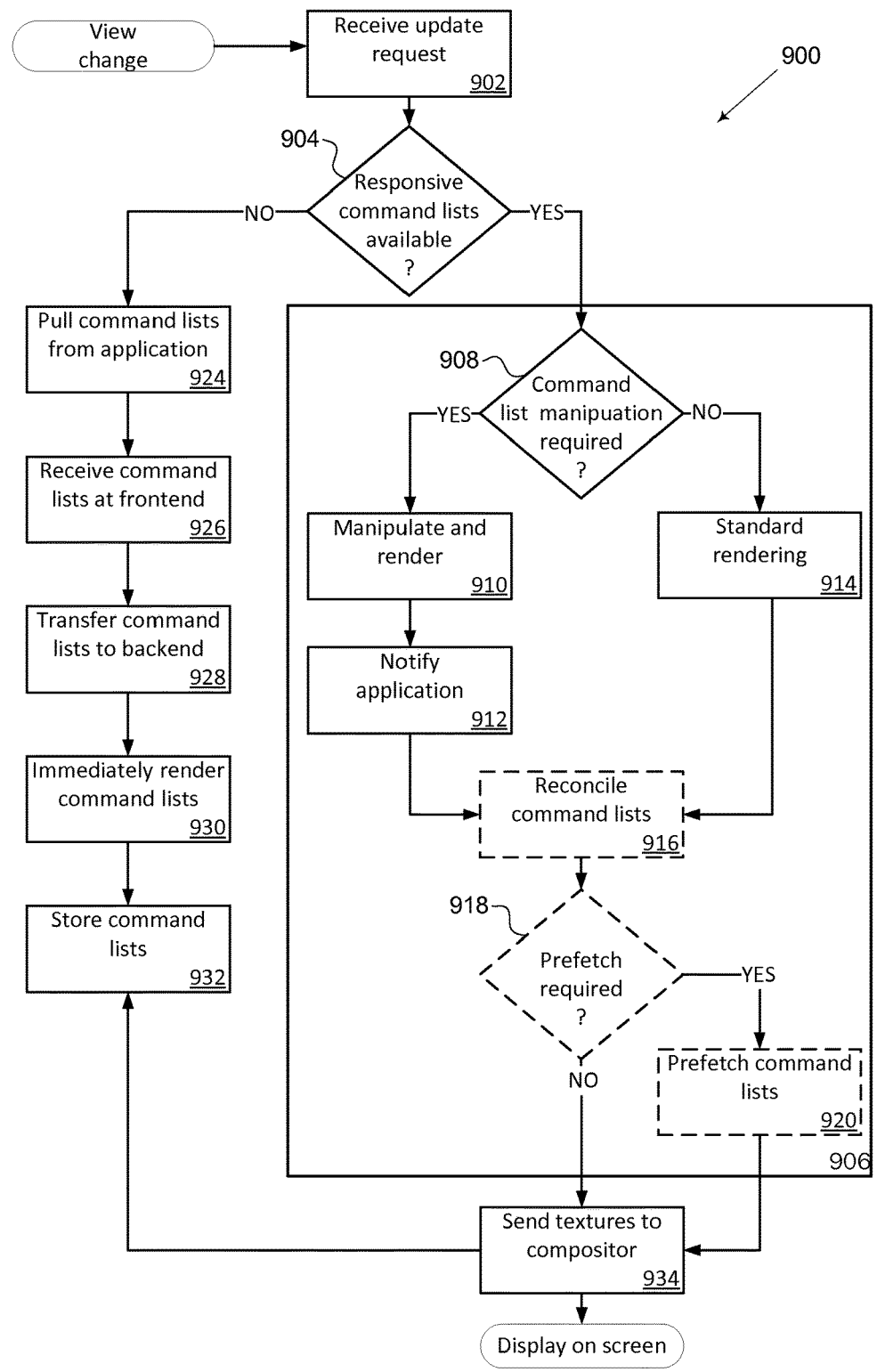
FIG. 9 is a high level flow chart of one embodiment of the cross-platform rendering engine method.

FIG. 9 is a high level flow chart of one embodiment of the cross-platform rendering engine method. The cross-platform rendering engine method 900 begins when a view change occurs that requires an update to the display surface relating to the application content. The view change may be the result of user interaction with the application such as data entry or interaction with the application user interface.

In an update request operation 902, an update request from the compositor to update a portion of the display surface is received and interpreted by the cross-platform rendering engine. In response to the update request, a content description inventory operation 904 determines whether the content descriptions associated with the portion of the display surface are stored by the backend. If so, the cross-platform rendering engine renders the textures specified in the update request from the available content descriptions according the expanded rendering operation 906.

A manipulation determination operation 908 determines if the update request received by the cross-platform rendering engine involves a manipulation of an existing content description that may performed by the backend without requiring a drawing request to be made to the application. For example, if the update request involves a request to zoom a portion of the application already described by a content description, the cross-platform rendering engine may respond to the update request without involving the application. The render manipulated content descriptions operation 912 manipulates the existing content description and generates display components that are compatible with the platform on which the cross-platform rendering engine is running. This may be accomplished by applying a scaling factor the appropriate existing content descriptions in the above example of a zoom action. An application notification operation 914 sends a notification informing the application that the cross-platform rendering engine has responded to the update request on behalf of the application. The notification gives the application to opportunity to make changes to what has been rendered.

If manipulation is not necessary, a standard rendering operation 914 generates display components that are compatible with the platform on which the cross-platform rendering engine is running from the existing content descriptions.

An optional content description reconciliation operation 916 issues a reconciliation request asking the application for a new content description to replace the content descriptions drawing to the same pixels. The reconciliation request instructs the application to draw a new content description for the bounding rectangle encompassing the content descriptions that overdrew the pixels. When received, the cross-platform rendering engine replaces the content descriptions that overdrew the pixel with the new content description.

An optional prefetch update operation 918 determines if the update request indicates that the current view has moved such that the cached content description should be updated or that additional content descriptions should be cached to allow the application to remain responsive to the user. For example, if the user is scrolling the view at a rapid rate, additional content descriptions in the direction of scroll may be requested. If so, a prefetch operation 920 sends a request to the application to supply content descriptions for areas of the virtual texture proximate to the current viewport. These cached content descriptions are stored for use should the current viewport move into those surrounding areas.

Returning to the content description inventory operation 904, if the needed to respond to the content descriptions are not available, a content description pull operation 924 sends a draw request to the application specifying the application content needed by the cross-platform rendering engine to respond to the update request. During the content description receipt operation 926, the cross-platform rendering engine receives the content descriptions from the application at the front end. A content description transfer operation 928 sends the content descriptions from the frontend to the backend via the cross-platform rendering engine channel architecture. A copy of the content descriptions may be retained by the frontend. At this point, an immediate rendering operation 930 generates display components that are platform-compatible from the content descriptions received in response to the content description pull operation. In various embodiments, the immediate rendering operation includes some or all of the operations described in the expanded rendering operation. A content description storage operation 932 stores the content descriptions for future use by the backend.

In both instances, a composition operation 934 transfers the rendered textures to the compositor for inclusion in a display surface that may be shown on the display of the computing device. At the conclusion of the method, the display surface is shown on the screen on the computing device.

The subject matter of this application may be practiced in a variety of embodiments as systems, devices, and other articles of manufacture or as methods. Embodiments may be implemented as hardware, software, computer readable media, or a combination thereof. The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 10:
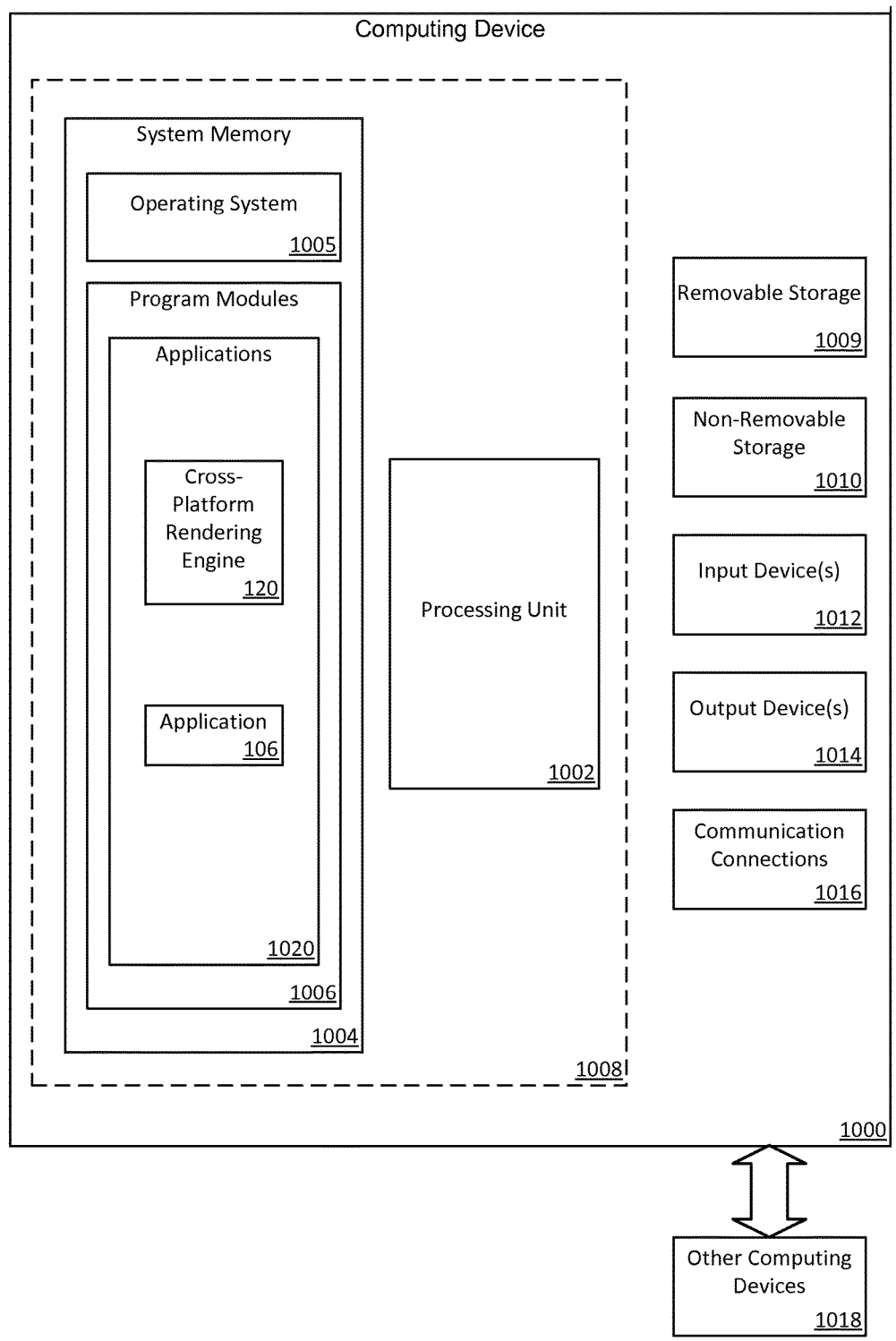
FIG. 10 is a block diagram illustrating one embodiment of the physical components of a computing device with which embodiments of the invention may be practiced.
Figure 11A:
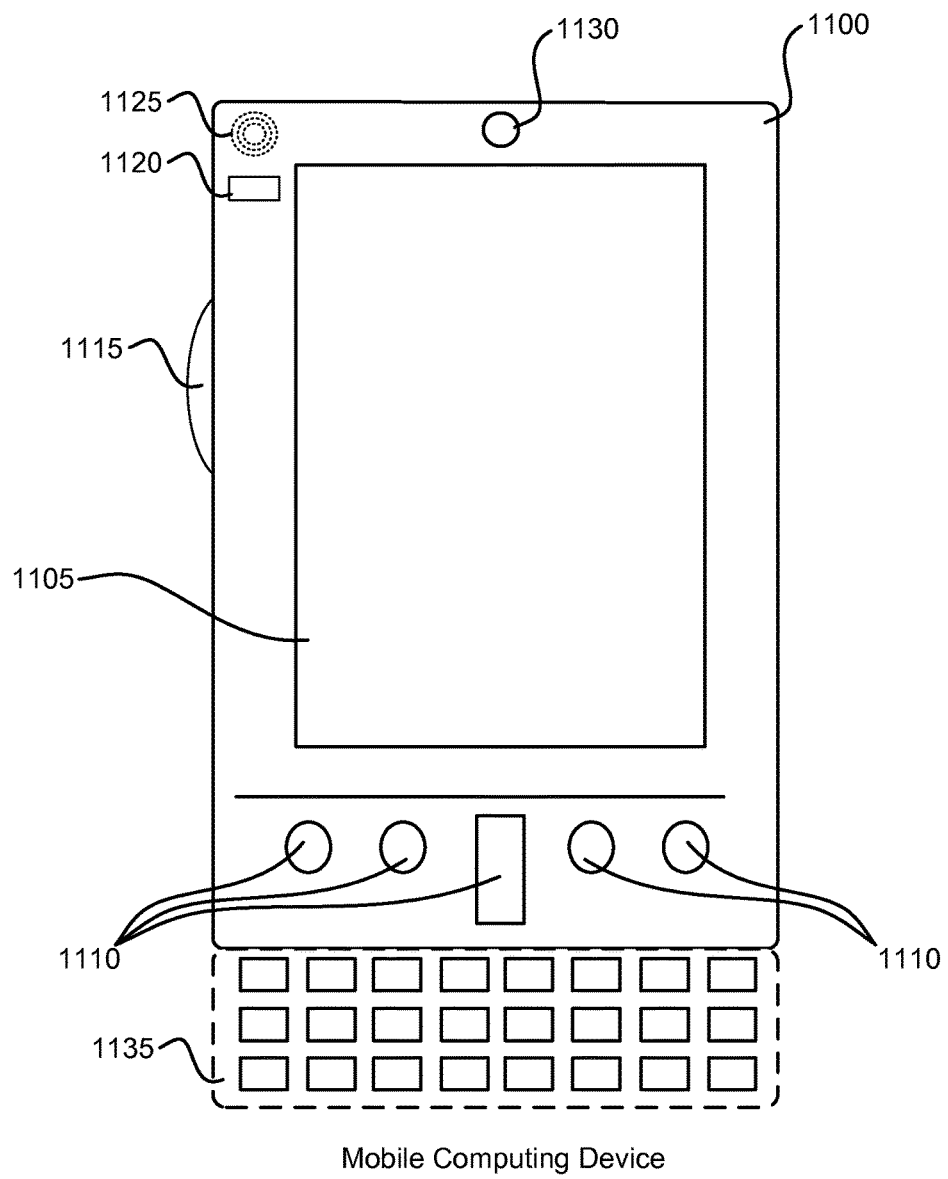
FIGS. 11A and 11B are simplified block diagrams of a mobile computing device with which embodiments of the present invention may be practiced.
Figure 11B:
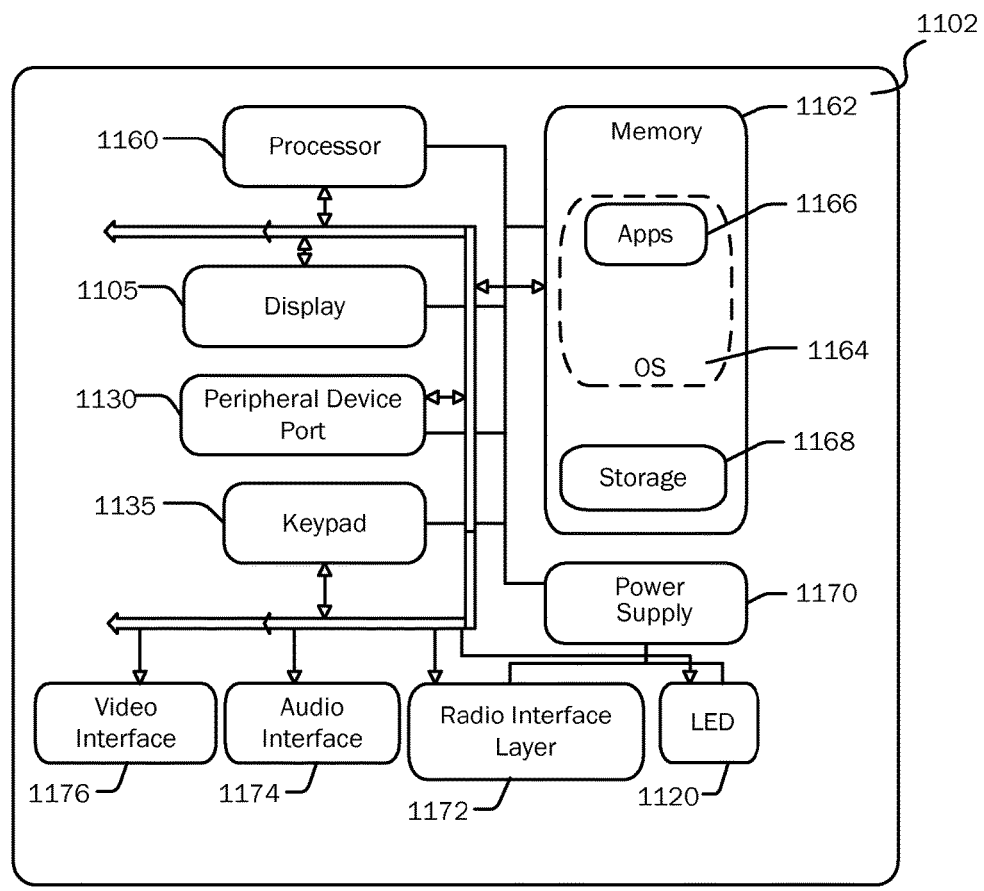

FIGS. 10 and 11A-B and the associated descriptions provide a discussion of a variety of operating environments in which embodiments of the invention may be practiced. However, the devices and systems illustrated and discussed are for purposes of example and illustration and are not limiting of a vast number of computing device configurations that may be utilized for practicing embodiments of the invention described above.

FIG. 10 is a block diagram illustrating one embodiment of the physical components (i.e., hardware) of a computing device 1000 with which embodiments of the invention may be practiced. The computing device components described below may be suitable for embodying computing devices including, but not limited to, a personal computer, a tablet computer, a surface computer, and a smart phone, or any other computing device discussed herein. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for running software applications 1020 such as the cross-platform rendering engine 120. For example, the operating system 1005 may be suitable for controlling the operation of the computing device 1000. Furthermore, embodiments of the invention may be practiced in conjunction with a graphics library, other operating systems, or any other application program and is not limited to any particular application or system. This basic configuration is illustrated by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated by a removable storage device 1009 and a non-removable storage device 1010.

As stated above, a number of program modules and data files may be stored in the system memory 1004. While executing on the processing unit 1002, the software applications 1020 may perform processes including, but not limited to, one or more of the stages of the cross-platform rendering method 900. Other program modules that may be used in accordance with embodiments of the present invention may include electronic mail and contacts applications, word processing applications, spreadsheet applications, database applications, slide presentation applications, drawing applications, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the illustrated components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein with respect to the software applications 1020 may be operated via application-specific logic integrated with other components of the computing device 1000 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1000 may also have one or more input device(s) 1012 such as a keyboard, a mouse, a pen, a sound input device, a touch input device, etc. The output device(s) 1014 such as a display, speakers, a printer, etc. may also be included. The aforementioned devices are examples and others may be used. The computing device 1000 may include one or more communication connections 1016 allowing communications with other computing devices 1018. Examples of suitable communication connections 1016 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all examples of computer storage media (i.e., memory storage). Computer storage media may include random access memory (RAM), read only memory (ROM), electrically erasable read-only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000.

FIGS. 11A and 11B are simplified block diagrams illustrating a mobile computing device 1100 with which embodiments of the invention may be practiced. Examples of suitable mobile computing devices include, but are not limited to, a mobile telephone, a smart phone, a tablet computer, a surface computer, and a laptop computer. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device 308 (e.g., a touch screen display). If included, an optional side input element 1115 allows further user input. The side input element 1115 may be a rotary switch, a button, or any other type of manual input element. In alternative embodiments, mobile computing device 1100 may incorporate more or less input elements. For example, the display 1105 may not be a touch screen in some embodiments. In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various embodiments, the output elements include the display 1105 for showing a graphical user interface, a visual indicator 1120 (e.g., a light emitting diode), and/or an audio transducer 1125 (e.g., a speaker). In some embodiments, the mobile computing device 1100 incorporates a vibration transducer for providing the user with tactile feedback. In yet another embodiment, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one embodiment of a mobile computing device. That is, the mobile computing device 1100 can incorporate a system (i.e., an architecture) 1102 to implement some embodiments. In one embodiment, the system 1102 is implemented as a smart phone capable of running one or more applications (e.g., browsers, e-mail clients, notes, contact managers, messaging clients, games, and media clients/players). In some embodiments, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including software applications 1020 described herein.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio 1172 that performs the function of transmitting and receiving radio frequency communications. The radio 1172 facilitates wireless connectivity between the system 1102 and the outside world via a communications carrier or service provider. Transmissions to and from the radio 1172 are conducted under control of the operating system 1164. In other words, communications received by the radio 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated embodiment, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present invention, the microphone may also serve as an audio sensor to facilitate control of notifications, as will be described below. The system 1102 may further include a video interface 1176 that enables an operation of an on-board camera 1130 to record still images, video streams, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio 1172 or via a distributed computing network. Similarly, such data/information may be readily transferred between computing devices for storage and use according to well-known data/information transfer and storage means, including electronic mail and collaborative data/information sharing systems.

The description and illustration of one or more embodiments provided in this application are intended to provide a complete thorough and complete disclosure the full scope of the subject matter to those skilled in the art and not intended to limit or restrict the scope of the invention as claimed in any way. The embodiments, examples, and details provided in this application are considered sufficient to convey possession and enable those skilled in the art to practice the best mode of claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method for rendering computer-generated display components associated with an application for display on a computer-enabled display surface, the method comprising the acts of:
   receiving a plurality of content descriptions from an application, the plurality of content descriptions including commands on how to draw a display component;
   storing the plurality of content descriptions in memory;
   receiving a drawing request from an application to graphically display application content;
   determining if the application content to be graphically displayed is stored as one or more of the plurality of content descriptions;
   when the drawing request is stored as one or more of the plurality of content descriptions, rendering, from the stored content description, display components that are representative of the application content to be graphically displayed and displaying the display components; and
   when the content description is not stored in memory, calling the application for a rasterized image representative of the application content to be graphically displayed and displaying the rasterized image.

2. The method of claim 1 further comprising the acts of:
   requesting the application to provide an additional content description for which is there is no corresponding stored content description;
   immediately rendering one or more display components from the additional content description; and
   storing the additional content description for subsequent use.

3. The method of claim 1 wherein the plurality of stored content descriptions are platform-agnostic and wherein, rendering, from the one or more stored content descriptions, display components that are representative of the application content to be graphically displayed includes rendering, from the one or more stored content descriptions, display components that are platform-specific.

4. The method of claim 1 further comprising adding one or more of the plurality of content descriptions associated with a same virtual texture representing application content to a collection of content descriptions.

5. The method of claim 4 further comprising the acts of:
   determining that at least three content descriptions in the collection of content descriptions have rendered the same at least one pixel;
   requesting a new content description for the portion of the virtual texture enclosed by a bounding box encompassing the portions of the virtual texture drawn by the at least three content descriptions from the application; and
   replacing the at least three content descriptions that rendered the same at least one pixel with the new content description in the collection of content descriptions.

6. The method of claim 1, further comprising:
   determining that the display components need to be updated;
   determining if a content description representative of the display components to be updated is stored as one or more of the plurality of content descriptions; and
   when the content description representative of the display components to be updated is not stored as one or more of the plurality of content description,
      pulling the content description representative of the display component to be updated from the application;
      rendering the pulled content description to updated display components; and
      displaying the updated display components.

7. The method of claim 6, wherein when the content description representative of the display components to be updated is stored as one or more of the plurality of content description, the method further comprising:
   determining that the stored content description representative of the display component components to be updated needs to be manipulated;

manipulating the stored content description representative of the display component components to be updated;
notifying the application of the manipulation; and
rendering the manipulated content description to updated display components; and
displaying the updated display components.

8. The method of claim 1, wherein application is operating on a first processing thread and wherein the rendering of the display components from the stored content description is performed by a rendering engine operating on a second processing thread, the second processing thread, wherein a nominal response time of the second processing thread is at least twice as fast as a nominal response time of the first processing thread.

9. The method of claim 8, wherein the nominal response time of the second processing thread is at least three-times as fast as the nominal response time of the first processing thread.

10. The method of claim 9, wherein the nominal response time of the second processing thread is at least four-times as fast as the nominal response time of the first processing thread.

11. A system rendering application content for display on a computer-enabled display surface comprising:
a first content description memory for storing a content description containing platform-agnostic commands received from an application generating application content, the commands describing how to draw the application content; and
a processor executing the application and a rendering engine,
wherein the rendering engine receives a drawing request from the application to display specific application content on a computer-enabled display surface and determines if the specific application content to be displayed is found within the content description;
when the specific application content to be displayed is found within the content description, rendering the content description into platform-specific commands that render display components representative of the specific application content for display on the computer-enabled display surface; and
when the specific application content to be displayed is not found within the content description, calling the application for a rasterized image representative of the application content to be displayed for display on the computer-enabled display surface.

12. The system of claim 11 wherein the rendering engine further comprises a frontend in communication with a backend, the frontend in communication with and receiving commands from the application, the backend rendering the display components from the content description.

13. The system of claim 12 wherein the first content description memory is associated with the frontend, the system further comprising a second content description memory associated with the backend.

14. The system of claim 13 wherein the rendering engine includes a direct communication channel between the frontend and the backend, the frontend passing content descriptions from the first content description memory to the second content description memory via the communication channel.

15. The system of claim 12 further comprising:
an application thread associated with the frontend; and
a user interface thread associated with the backend.

16. The system of claim 15 further comprising a rendering thread for rasterizing the content descriptions into display component raster images, the rendering thread responsive to requests to render content sent by the user interface thread.

17. The system of claim 11 wherein the rendering engine is in communication with a compositor responsible for compositing a final image for display on the computer-enabled display surface.

18. A computer readable storage device containing computer executable instructions which, when executed by a computer, perform a method for displaying application content on a computer-enabled display surface, the method comprising the acts of:
receiving a plurality of content descriptions from an application, the plurality of content descriptions including commands on how to draw a display component;
storing the plurality of content descriptions in memory;
receiving a drawing request from an application to graphically display application content;
determining if the application content to be graphically displayed is stored as one or more of the plurality of content descriptions;
when the drawing request is stored as one or more of the plurality of content descriptions, rendering, from the stored content description, display components that are representative of the application content to be graphically displayed and displaying the display components; and
when the content description is not stored in memory, calling the application for a rasterized image representative of the application content to be graphically displayed and displaying the rasterized image.

19. The computer readable storage device of claim 18 wherein the method further comprises: manipulating the stored content description in response to responding to a request to manipulate a selected area of application content.

20. The computer readable storage device of claim 19 wherein the request to manipulate a selected area of application content is a request to zoom or a request to pan.

21. The computer readable storage device of claim 18 wherein the method further comprises the act of grouping the stored content description with other content descriptions associated with a selected area of application content generated by the application into a content description composite.

* * * * *